(12) United States Patent
Omori

(10) Patent No.: US 10,764,508 B2
(45) Date of Patent: Sep. 1, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Hirotaka Omori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/045,026

(22) Filed: Jul. 25, 2018

(65) Prior Publication Data
US 2019/0037146 A1 Jan. 31, 2019

(30) Foreign Application Priority Data
Jul. 31, 2017 (JP) .................. 2017-148613

(51) Int. Cl.
| | |
|---|---|
| *H04N 5/243* | (2006.01) |
| *G06T 5/00* | (2006.01) |
| *G06T 7/11* | (2017.01) |
| *H04N 5/202* | (2006.01) |
| *H04N 5/232* | (2006.01) |
| *G06T 5/40* | (2006.01) |
| *H04N 5/228* | (2006.01) |
| *H04N 9/69* | (2006.01) |

(52) U.S. Cl.
CPC ............ *H04N 5/243* (2013.01); *G06T 5/001* (2013.01); *G06T 5/008* (2013.01); *G06T 5/40* (2013.01); *G06T 7/11* (2017.01); *H04N 5/202* (2013.01); *H04N 5/228* (2013.01); *H04N 5/23229* (2013.01); *G06T 2207/20104* (2013.01); *G06T 2207/20132* (2013.01); *H04N 9/69* (2013.01)

(58) Field of Classification Search
None
See application file for complete search history.

(56) References Cited

U.S. PATENT DOCUMENTS

| | | | |
|---|---|---|---|
| 8,823,834 B2* | 9/2014 | Yamaoka ........... | G06K 9/00362 348/239 |
| 2007/0071318 A1* | 3/2007 | Yamashita .............. | G06T 5/004 382/169 |
| 2010/0329559 A1* | 12/2010 | Shindo .................... | G06T 5/009 382/172 |
| 2011/0052056 A1* | 3/2011 | Kigure ................. | G06K 9/4642 382/167 |
| 2017/0041543 A1* | 2/2017 | Kikuchi ............. | H04N 5/23274 |
| 2018/0068540 A1* | 3/2018 | Romanenko ......... | G06K 9/3233 |
| 2018/0096449 A1* | 4/2018 | Racz ..................... | G06T 3/0012 |

FOREIGN PATENT DOCUMENTS

JP 03-126377 A 5/1991

* cited by examiner

*Primary Examiner* — James M Hannett
(74) *Attorney, Agent, or Firm* — Canon U.S.A., Inc. IP Division

(57) ABSTRACT

An apparatus provides a unit capable of improving gradation characteristics of a plurality of images (crop images) even in a case where a plurality of users individually performs cropping (cutting out) on a distributed image, calculates a target gradation range based on histograms of the regions cropped by the plurality of users, and executes gradation conversion based on an overlapping ratio of the plurality of target gradation ranges.

15 Claims, 19 Drawing Sheets

IMAGE PROCESSING APPARATUS, CONTROL METHOD THEREOF, AND STORAGE MEDIUM

BACKGROUND OF THE INVENTION

Field of the Invention

The aspect of the embodiment relates to an image processing apparatus, a control method of the image processing apparatus, and a storage medium, and particularly relates to gradation conversion processing of a moving image signal.

Description of the Related Art

In a monitoring system, a monitoring camera distributes an entire image through a network, so that a user can monitor the distributed image. Further, there is also provided a monitoring system which enables a user to monitor a part of an image cut out (cropped) from the distributed image. The user can freely specify a region to be cropped. At this time, if the distributed image presents a scene with a great luminance difference, overexposure or underexposure may occur in the image monitored by the user.

Conventionally, as a method of executing gradation conversion processing for solving the above-described issue, there has been known high dynamic range processing (hereinafter, called as "HDR processing") for acquiring a high dynamic range image by combining a plurality of images obtained in different exposure conditions. However, as a difference in imaging timing between the plurality of images arises, this method is thought to be unsuitable for capturing a scene including moving objects. Further, there may be an issue in that a luminance difference occurs in the image according to a position of the moving object, and an issue in that a double image is generated because of failure in image composition. Furthermore, there is also an issue in that a frame rate decreases because image composition is executed by acquiring a plurality of images.

With respect to the above-described issues, Japanese Patent Application Laid-Open No. 03-126377 discusses a method for executing gradation conversion by generating a gamma curve such that overexposure or underexposure can be suppressed in a luminance region with high frequencies, based on a frequency of each luminance in a cumulative histogram of one frame. The gamma conversion processing discussed in Japanese Patent Application Laid-Open No. 03-126377 is an image processing method to be executed through processing in one frame according to a characteristic of a luminance histogram of an input image, and gradation conversion can be executed without losing visibility of a moving object as it does not require composition of a plurality of images.

However, through a conventional method of generating a gamma curve from the cumulative histogram as discussed in Japanese Patent Application Laid-Open No. 03-126377, a gradation range near the gradation value having the high frequency is improved. Therefore, in the above-described use case of the monitoring camera, there might be an issue in which the user cannot see the image with appropriate gradation when a plurality of users monitors the images. For example, even if a user desires to see the image (image being cropped by the user), i.e., a gradation characteristic of the gradation value is to be improved, it is not possible to improve the gradation characteristic if a frequency of the gradation value is less than a frequency of a gradation value of the image being cropped by another user.

Therefore, a method of improving gradation characteristics of a plurality of images (crop images) even if a plurality of users individually performs cropping (cutting) on a distributed image is sought.

SUMMARY OF THE INVENTION

An apparatus includes a cropping unit configured to crop a plurality of arbitrary image regions from an input image, a histogram generation unit configured to generate a histogram of each of the arbitrary image regions cropped by the cropping unit, a gradation range calculation unit configured to calculate a target gradation range of each of the image regions from the histogram of each of the image regions, and a gradation conversion unit configured to execute gradation conversion of the input image based on the target gradation range of each of the image regions calculated by the gradation range calculation unit.

Further features of the disclosure will become apparent from the following description of exemplary embodiments with reference to the attached drawings.

DESCRIPTION OF THE EMBODIMENTS

Hereinafter, an exemplary embodiment of the disclosure will be described in detail with reference to the appended drawings. Although an example in which a monitoring camera is used as an imaging apparatus will be described below, the purpose of use of the imaging apparatus is not limited to monitoring. Further, the disclosure should not be limited to an imaging apparatus and is also applicable to image processing executed by a personal computer (PC) using software.

Figure 1:
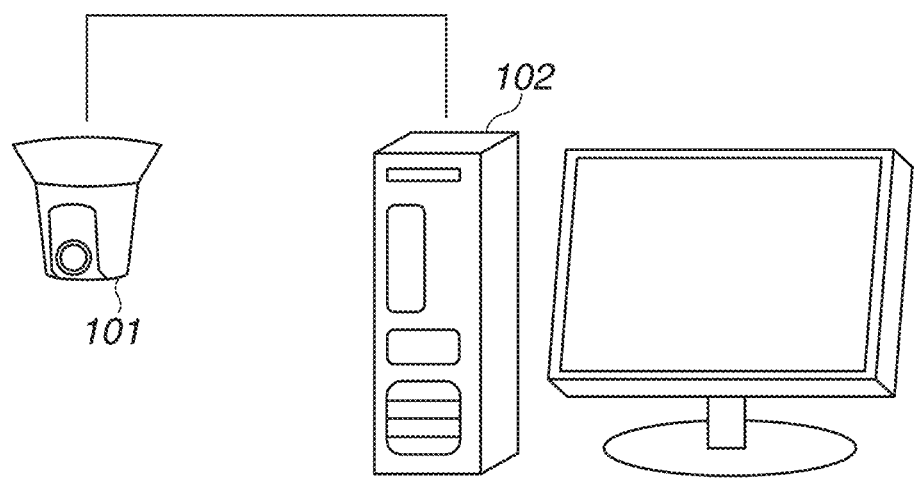
FIG. 1 is a block diagram illustrating a configuration example of an imaging system according to the aspect of the embodiments.

FIG. 1 is a block diagram illustrating a configuration example of an imaging system according to the aspect of the embodiments. The imaging system in FIG. 1 is configured of a monitoring camera 101 serving as an apparatus that captures an image and processes the captured image and a client apparatus 102 connected to the monitoring camera 101 via an IP network in a mutually communicable state.

The monitoring camera 101 distributes, to the client apparatus 102, image information of an image acquired by capturing an object and processed.

The client apparatus 102 displays the image of the image information distributed from the monitoring camera 101. Further, the client apparatus 102 can accept operation executed by a user, so that the client apparatus 102 can execute control of changing an imaging direction or a focal length of the monitoring camera 101, switching an auto-focus/manual-focus (AF/MF) mode thereof, or cropping out an image, via the network through the user operation. In the present exemplary embodiment, although the monitoring camera 101 is used as an image processing apparatus, the configuration may be such that an image signal acquired by the monitoring camera 101 is transmitted to the client apparatus 102 without executing image processing on the image signal, and the client apparatus 102 executes the image processing on the received image signal.

Figure 2:
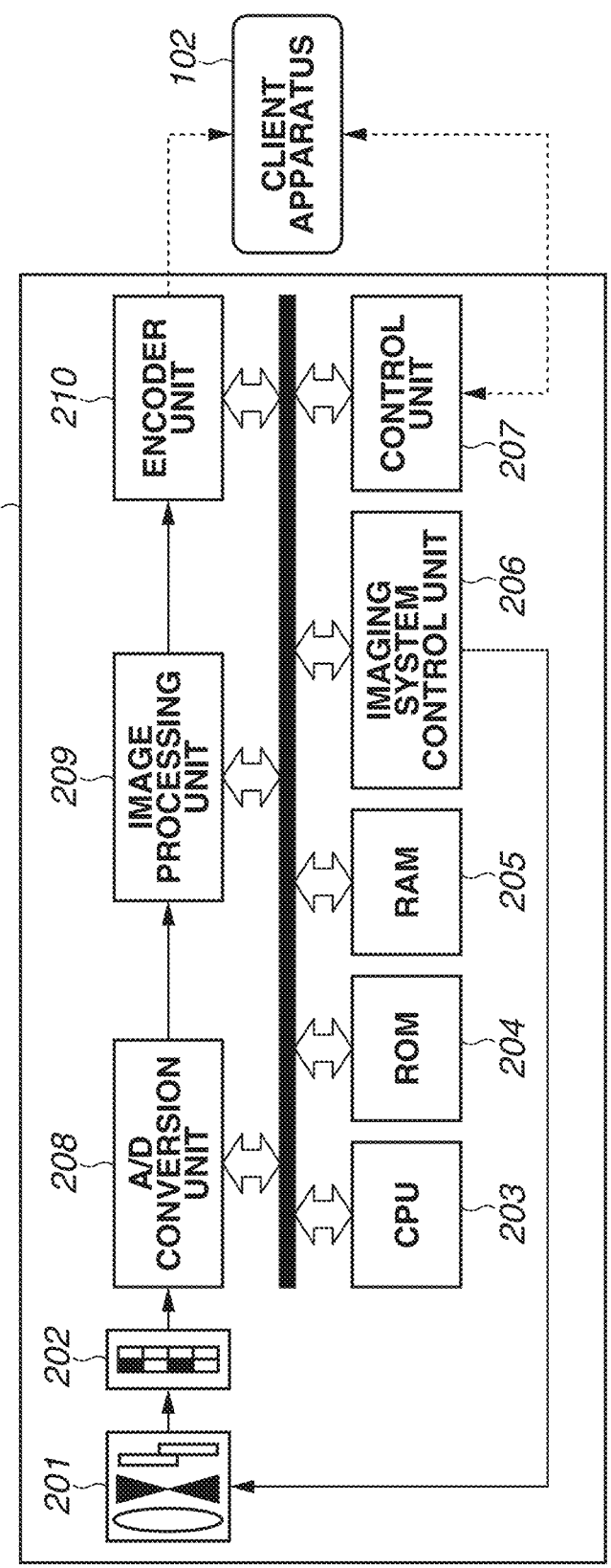
FIG. 2 is a block diagram illustrating a configuration example of an imaging apparatus according to the aspect of the embodiments.

FIG. 2 is a block diagram illustrating a configuration example of the imaging apparatus (monitoring camera 101) according to the aspect of the embodiments. Details of an internal configuration example of the monitoring camera 101 will be described below.

An imaging optical system 201 includes an optical lens, an optical filter, an aperture, and a shutter, and collects optical information of an object. For example, the optical lens may be a zoom lens that moves in the optical axis direction to change a focal length or a focus lens that moves in the optical axis direction to adjust a focal point. Examples of the optical filter include a visible light cutting filter, an infrared cutting filter, and a neutral density (ND) filter. In addition, in the configuration example illustrated in FIG. 2, although the monitoring camera 101 is a lens-integrated imaging apparatus integrally including the imaging optical system 201, the monitoring camera 101 may be an interchangeable-lens imaging apparatus including an interchangeable lens.

An imaging element unit 202 acquires color information by combining an element that converts the optical information collected by the imaging optical system 201 into a current value with a color filter, and outputs a formed object image as an electric signal (analog signal). Further, the imaging element unit 202 serves as an image sensor capable of setting an arbitrary exposure time with respect to all of pixels.

A central processing unit (CPU) 203 controls an entirety of the monitoring camera 101 to control image-capturing processing, image processing, and image output processing. The CPU 203 sequentially reads and interprets a command stored in a read only memory (ROM) 204 or a random access memory (ROM) 205, and executes processing according to a result of reading and interpretation.

An imaging system control unit 206 controls the imaging optical system 201 to adjust a focus, open a shutter, and adjust an aperture. For example, the imaging system control unit 206 acquires a setting value from an image processing unit 209 to drive the optical lens or switch the optical filter according to the setting value. In addition, the configuration may be such that the setting value is calculated by the CPU 203, and the imaging system control unit 206 drives the imaging optical system 201 based on an instruction from the CPU 203 and the calculation result thereof.

A control unit 207 controls the entirety of the monitoring camera 101 according to an instruction from the client apparatus 102. Alternatively, the configuration may be such that the control unit 207 receives the instruction from the client apparatus 102 and transmits the instruction to the CPU 203 or the imaging system control unit 206, and the CPU 203 or the imaging system control unit 206 controls the monitoring camera 101.

An analog/digital (A/D) conversion unit 208 converts the light amount of the object detected by the imaging optical system 201 into a digital signal value. The converted digital signal (image signal) is transmitted to the image processing unit 209.

The image processing unit 209 executes image processing such as development processing, filter processing, sensor correction, or noise removal with respect to the received digital signal (image signal). Further, for example, when exposure adjustment is to be executed, the image processing unit 209 transmits luminance information of the image to the imaging system control unit 206 (or the CPU 203), calculates a setting value for acquiring an image with appropriate exposure based on the illuminance information, and executes exposure adjustment by driving the imaging optical system 201. Furthermore, adjustment based on the image information, e.g., auto-focus control, is executed in the same manner. It is assumed that exposure adjustment and auto-focus control are executed by a known technique, and details thereof will be omitted. The image generated by the image processing unit 209 is transmitted to an encoder unit 210. Details of image processing executed by the image processing unit 209 will be described below.

The encoder unit 210 executes processing of converting image data processed by the image processing unit 209 into data in a file format such as Motion Jpeg or H.264. The converted image information is transmitted to the client apparatus 102 via a network (not illustrated).

Figure 3:
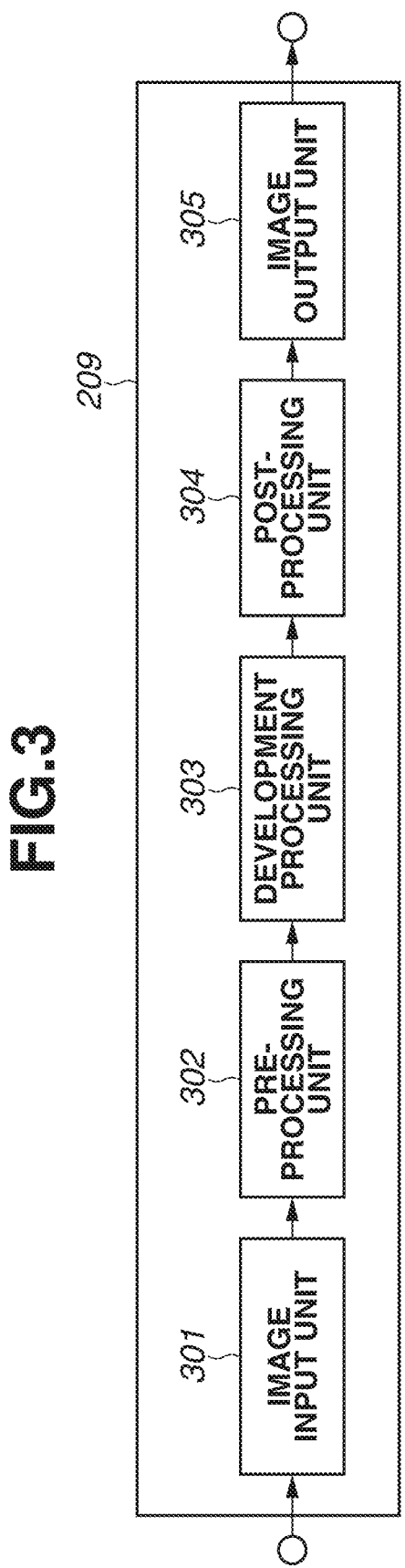
FIG. 3 is a block diagram illustrating a configuration example of an image processing unit according to a first exemplary embodiment of the disclosure.

Hereinafter, a first exemplary embodiment will be described. FIG. 3 is a block diagram illustrating a configuration example of an image processing unit (image processing unit 209) according to the present exemplary embodiment of the disclosure. The image processing unit 209 of the present exemplary embodiment includes an image input unit 301, a pre-processing unit 302, a development processing unit 303, a post-processing unit 304, and an image output unit 305.

The image input unit 301 receives image data that is captured by the imaging element unit 202 and converted into a digital signal value through the A/D conversion unit 208.

The pre-processing unit 302 executes correction processing such as removal processing of fixed pattern noise caused by a sensor or gain adjustment processing.

Figure 4:
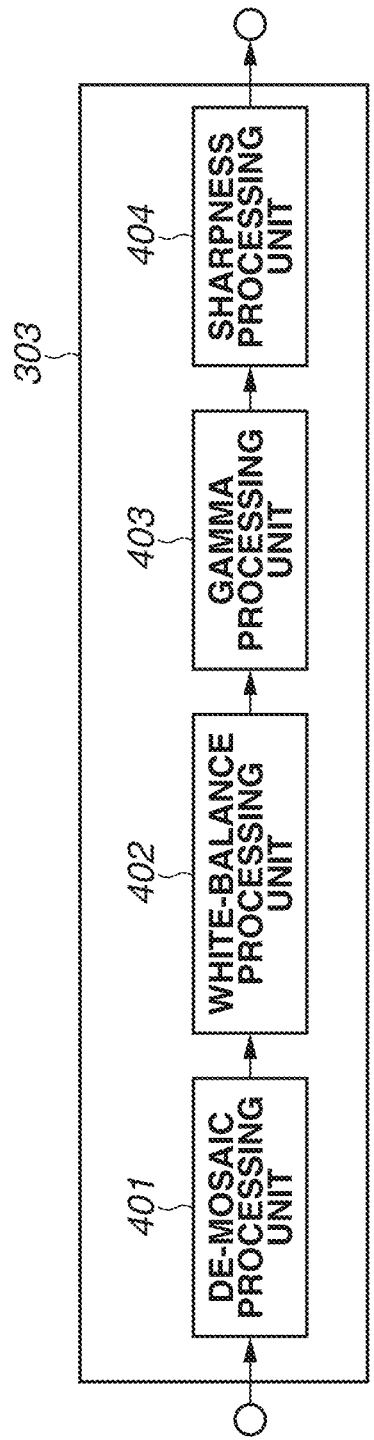
FIG. 4 is a block diagram illustrating a configuration example of a development processing unit according to a first exemplary embodiment of the disclosure.

FIG. 4 is a block diagram illustrating a configuration example of a development processing unit (development processing unit 303) of the present exemplary embodiment of the disclosure. The development processing unit 303 executes predetermined processing on the image data received from the pre-processing unit 302 through a de-mosaic processing unit 401, a white-balance processing unit 402, a gamma processing unit 403, and a sharpness processing unit 404. The gamma processing unit 403 will be described below in detail. It is assumed that processing executed by the other processing units is executed using a known technique, and thus details thereof will be omitted.

For example, the post-processing unit 304 executes post-processing for reducing the randomly generated noise by performing, on the image processed through development processing, noise-reduction (NR) filtering in a spatial direction and a temporal direction.

The image output unit 305 outputs the image signal processed through the development processing to the encoder unit 210, and the image signal is encoded by the encoder unit 210 and output to the client apparatus 102.

Hereinafter, gamma processing of the present exemplary embodiment of the disclosure will be described in detail with reference to FIGS. 5 to 9.

Figure 5:
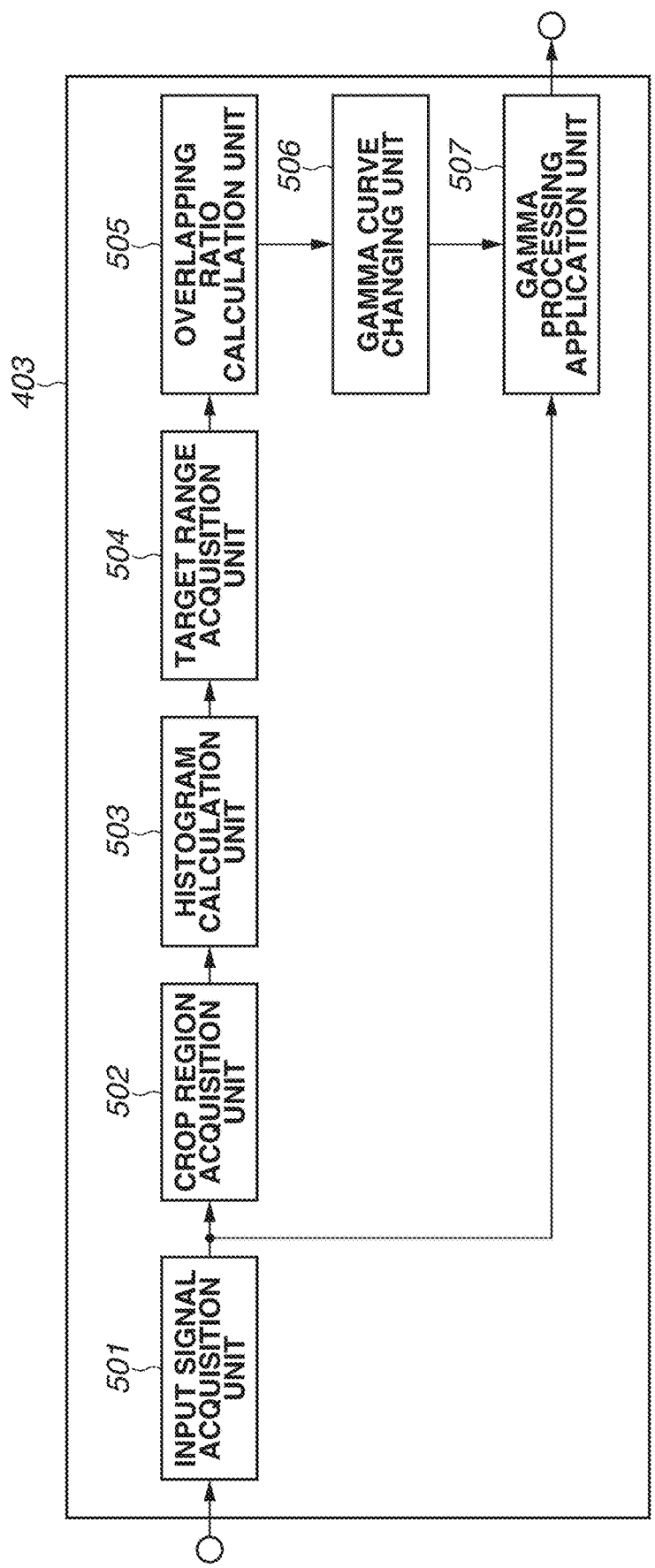
FIG. 5 is a block diagram illustrating a configuration example of a gamma processing unit according to the first exemplary embodiment of the disclosure.

FIG. 5 is a block diagram illustrating a configuration example of a gamma processing unit (gamma processing unit 403) of the first exemplary embodiment of the disclosure. The gamma processing unit 403 according to the present exemplary embodiment executes gradation conversion with respect to an image signal. The gamma processing unit 403 includes an input signal acquisition unit 501, a crop region acquisition unit 502, a histogram calculation unit 503, a target range acquisition unit 504, an overlapping ratio calculation unit 505, a gamma curve changing unit 506, and a gamma processing application unit 507. Processing executed by the respective processing units will be described in detail with reference to a flowchart of the gamma processing illustrated in FIG. 6.

Figure 6:
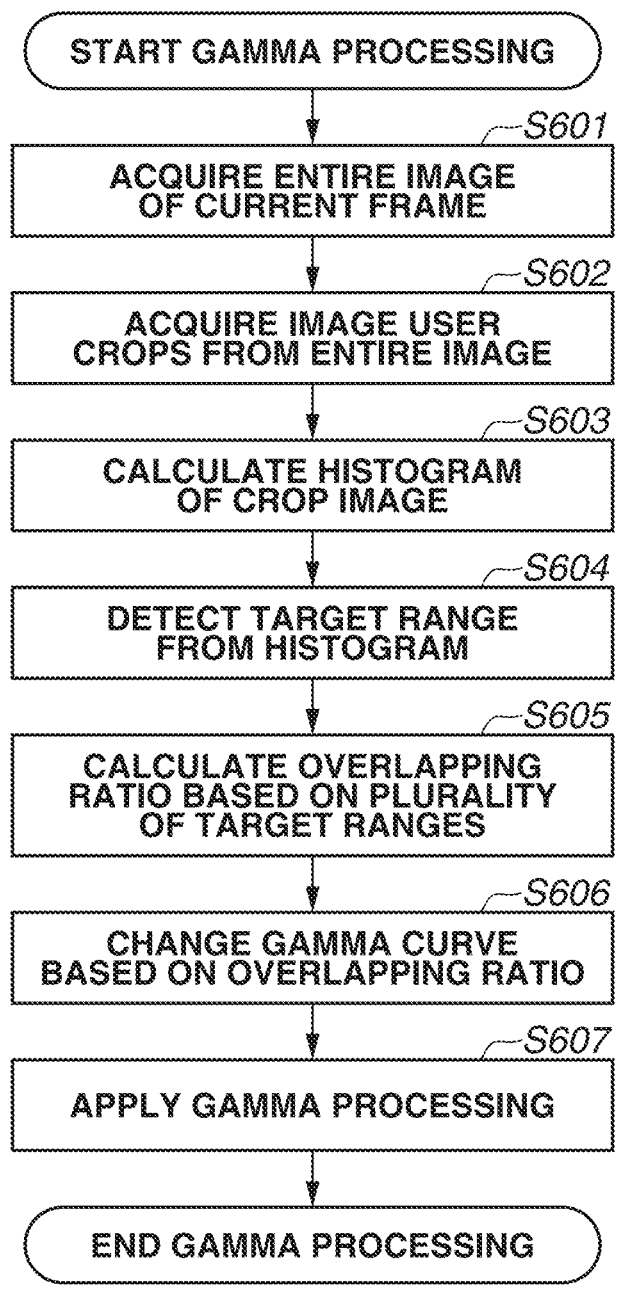
FIG. 6 is a flowchart illustrating an example of gamma processing according to the first exemplary embodiment of the disclosure.

Hereinafter, a processing flow of the gamma processing unit 403 of the present exemplary embodiment will be described with reference to a flowchart in FIG. 6. FIG. 6 is a flowchart illustrating an example of the gamma processing according to the present exemplary embodiment of the disclosure. The flowchart in FIG. 6 illustrates a processing procedure executed by the CPU 203 by controlling each processing block. The CPU 203 loads the program stored in the memory (the ROM 204 or the RAM 205) included in the CPU 203 and executes the loaded program to realize the above-described processing.

First, in step S601, the input signal acquisition unit 501 acquires a signal of the entire image processed by the de-mosaic processing unit 401 and the white-balance processing unit 402 in the development processing unit 303. Alternatively, the input signal acquisition unit 501 may acquire the entire image processed by the de-mosaic processing unit 401, and the white balance processing may be executed thereon after the gamma processing according to the present exemplary embodiment is executed by the gamma processing unit 403.

In step S602, the crop region acquisition unit 502 acquires an image of an image region where the user executes cropping (image cropping) from among the entire image. The crop region acquisition unit 502 acquires information about the crop region being cropped, from the client apparatus 102 via the network to extract, and extracts and acquires only an image signal corresponding to that image region. In the present exemplary embodiment, the crop region acquisition unit 502 uses the region information received by the control unit 207 to acquire the image signal of a portion corresponding to the region information. In a case where a plurality of users monitors images of different image regions, the crop region acquisition unit 502 acquires image signals of all of the crop regions. On the other hand, in a case where none of the users executes a crop image monitoring, i.e., only the entire image is monitored, the processing in steps S603 to S606 is not executed, and the processing proceeds to step S607.

Then, in step S603, the histogram calculation unit 503 generates a histogram of the crop image (a signal of a crop image region) received from the crop region acquisition unit 502. When a plurality of crop images (signals of crop image regions) is received, the histogram calculation unit 503 generates a plurality of histograms for the respective image regions.

In step S604, the target range acquisition unit 504 detects a target gradation range for each user from the histogram received from the histogram calculation unit 503. The target gradation range defined in the disclosure refers to a gradation range where improvement of a gradation characteristic is considered to be particularly desirable from among the gradation ranges of the images cropped by respective users. Specifically, the conditions that a ratio of frequencies of gradation values within a predetermined range regarded as a target gradation range to the entire frequency should be a ratio of a threshold value or more, and that a width of the gradation range should fall within a predetermined range are to be satisfied.

For example, a gradation range as a target of determination on whether the gradation range is the target gradation range is expressed as gradation values "i" to "j", whereas a sum of frequencies of the gradation values "i" to "j" is expressed as "sum(i, j)". Further, a total gradation width in the crop image (crop image region) is expressed as "all", and a sum of the frequencies of the entire luminance histogram is expressed as "sum(all)". Then, the gradation values "i" to "j" is regarded to represent a target gradation range if the following formulas 1 and 2 are satisfied when predetermined values are expressed as "th1" and "th2".

$$\text{sum}(i, j) > \text{sum(all)} \times th1 \qquad \text{Formula 1}$$

$$j - i < \text{all} \times th2 \qquad \text{Formula 2}$$

Figure 7:
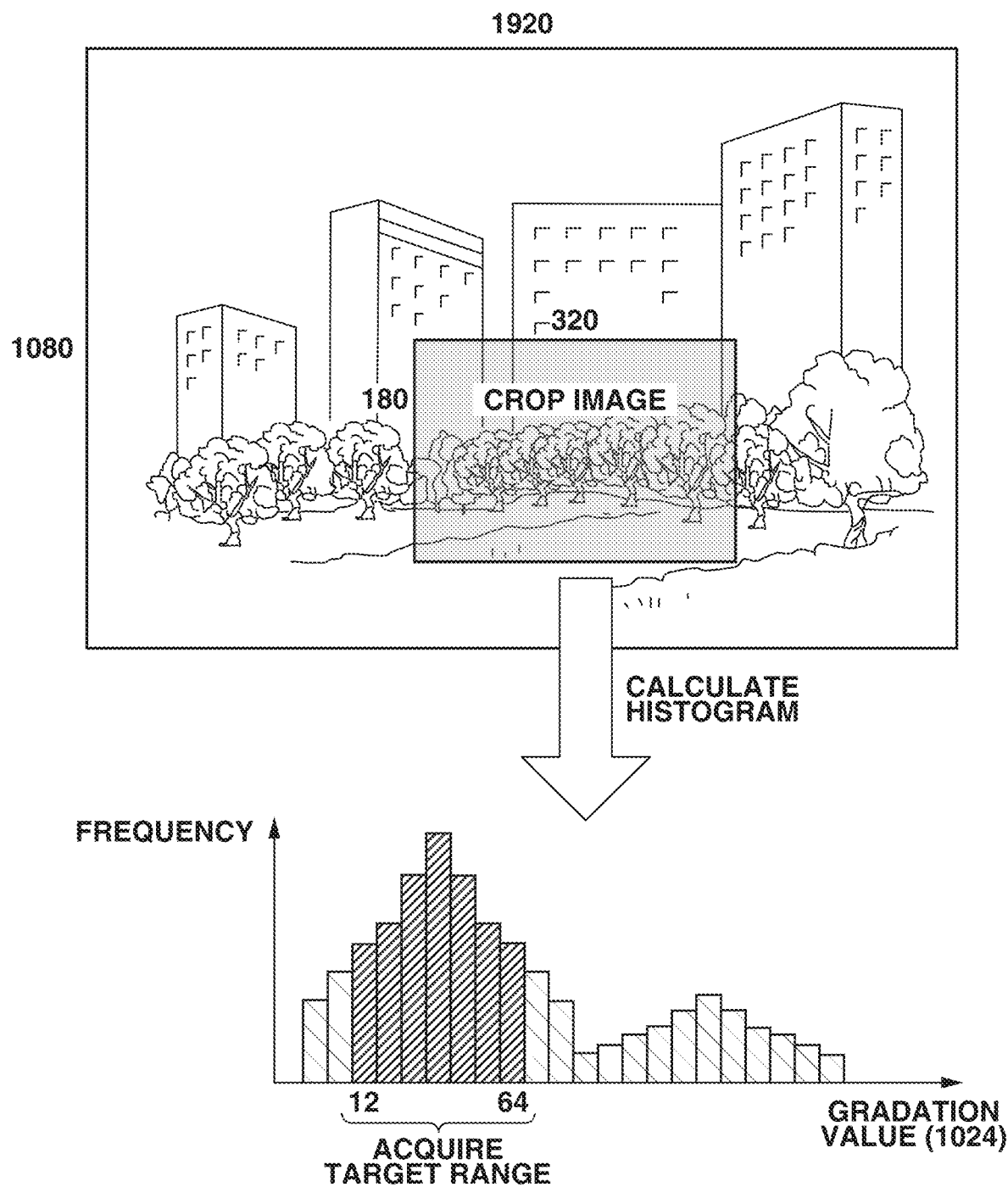
FIG. 7 is a diagram illustrating an example of processing for acquiring a target gradation range from a clip image according to the first exemplary embodiment of the disclosure.

The formula 1 will be described using an example where the user monitors a crop image having a size of 320×180 cropped from an image in full high definition (HD) (1920× 1080), as more specifically illustrated in FIG. 7. In such a case, the threshold value th1 should be 1% of a total frequency of the luminance histogram of the crop image (i.e., a total number of pixels in the image region acquired from the crop region acquisition unit 502). At this time, if it is assumed that the target gradation range ranges from the gradation values of 12 to 64, the following formula 3 is satisfied.

$$\text{sum } (12,64) > 320 \times 180 \times 1/100 \qquad \text{Formula 3}$$

Further, with respect to the formula 2, if it is assumed that the total gradation width is 10-bit, and the threshold value th2 is 10%, the gradation values of "i" to of the target gradation range should satisfy the following formula 4.

$$j - i < 2^{10} \times 10/100 \qquad \text{Formula 4}$$

In addition, the threshold values th1 and th2 are not limited to the above-described particular percentages, and any values are possible as long as the target gradation range of the user can be detected. In order to satisfy the formula 1, frequencies with respect to the other luminance ranges has to be higher as a value of the threshold value th1 becomes greater. In other words, the threshold value th1 is increased if an object which occupies a larger area within the crop image is specified as a target range. A possibility of satisfying the formula 2 will be greater as a value of the threshold value th2 is increased, and gradation taken as a target range will be increased. A value of the threshold value th2 is set to be smaller with respect to a scene having an object in which the user would like to particularly focus on an arbitrary narrow range. On the contrary, a value of the threshold value th2 is set to be greater with respect to a scene having an object in which the user would like to focus on a range of a certain width. A plurality of target gradation ranges may be included in a single crop image. Further, a calculation method of the target gradation range is not limited to the above-described method, and any calculation method may be employed as long as the target gradation range can be calculated at each of the crop images.

Figure 8:
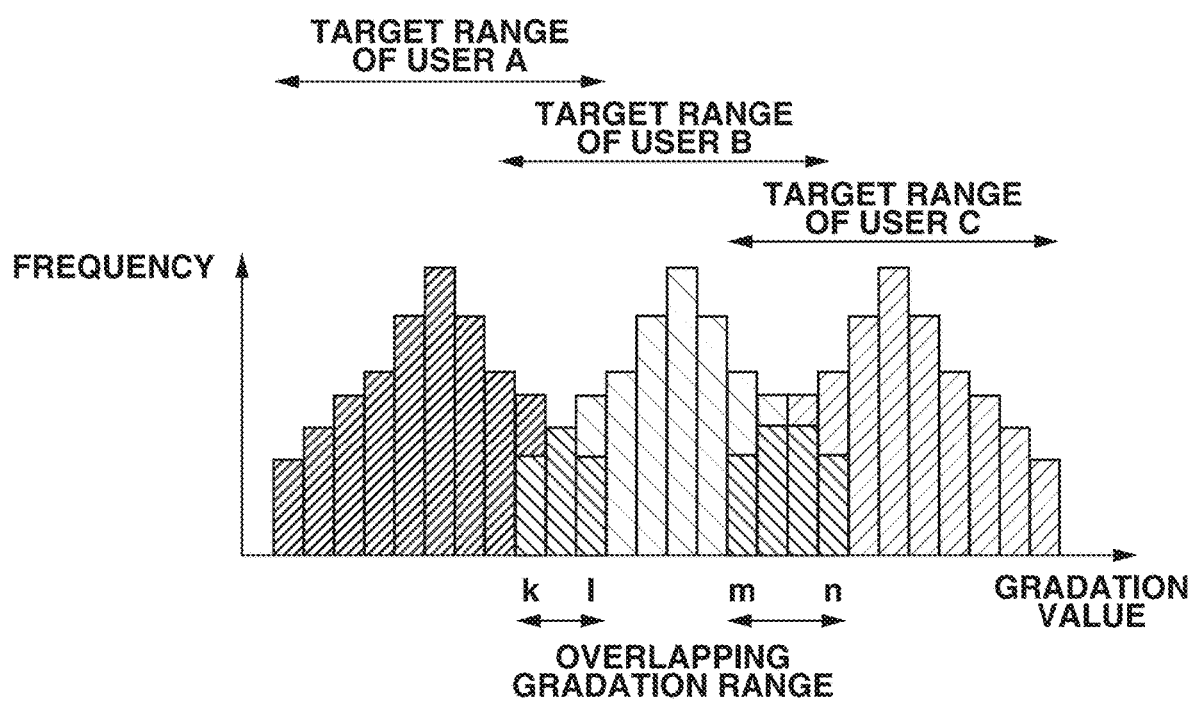
FIG. 8 is a graph illustrating a state where target gradation ranges of a plurality of users overlap each other according to the first exemplary embodiment of the disclosure.

Next, in step S605, based on a plurality of target gradation ranges acquired from the target range acquisition unit 504, the overlapping ratio calculation unit 505 calculates a ratio of a gradation width where the target gradation ranges of respective users overlap each other. Specifically, as illustrated in FIG. 8, the target gradation ranges of the users A and B overlap with each other at the gradation values "k" to "1", whereas the target gradation ranges of the users B and C overlap with each other at the gradation values "m" to "n". In this case, if the total gradation width is 10-bit, an overlapping ratio "overlap ratio" is defined by the following formula 5.

$$\text{overlap\_ratio} = \frac{(l-k) + (n-m)}{2^{10}} \qquad \text{Formula 5}$$

In addition, a value of the overlapping ratio ranges from 0.0 to 1.0, and the overlapping ratio calculated by the formula 5 is input to the gamma curve changing unit 506.

In step S606, the gamma curve changing unit 506 changes a gamma curve according to the overlapping ratio acquired from the overlapping ratio calculation unit 505.

Figure 9:
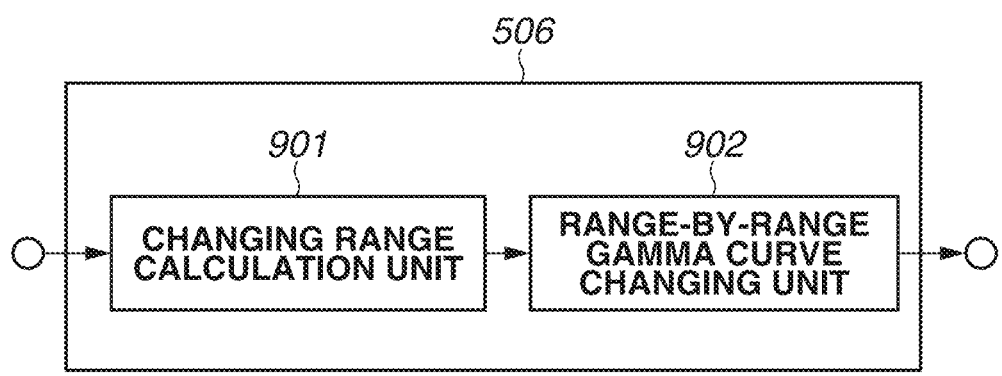
FIG. 9 is a block diagram illustrating a configuration example of a gamma curve changing unit according to the first exemplary embodiment of the disclosure.

FIG. 9 is a block diagram illustrating a configuration example of the gamma curve changing unit 506 of the present exemplary embodiment of the disclosure. The gamma curve changing unit 506 includes a changing range calculation unit 901 and a range-by-range gamma curve changing unit 902. Through a comparison between the overlapping ratio and a predetermined threshold value (hereinafter, a threshold value used by the gamma curve changing unit 506 is called as "th3"), the changing range calculation unit 901 calculates a gradation range in which a predetermined gamma curve is to be changed. The range-by-range gamma curve changing unit 902 changes the gamma curve based on the gradation range which is calculated by the changing range calculation unit 901 and is to be changed.

Figure 10:
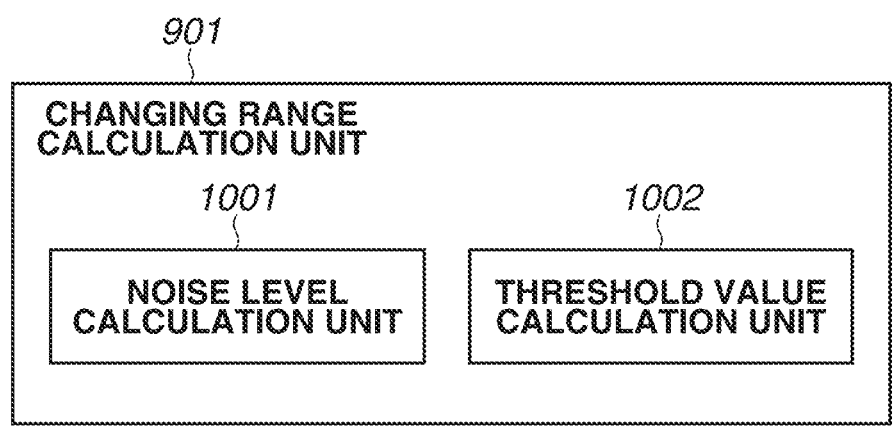
FIG. 10 is a block diagram illustrating a configuration example of a changing range calculation unit according to the first exemplary embodiment of the disclosure.

FIG. 10 is a block diagram illustrating a configuration example of the changing range calculation unit 901 of the present exemplary embodiment of the disclosure. The changing range calculation unit 901 includes a noise level calculation unit 1001 and a threshold value calculation unit 1002. The noise level calculation unit 1001 calculates a noise level indicating dispersion of noise superimposed on the entire image. Based on the noise level calculated by the noise level calculation unit 1001, the threshold value calculation unit 1002 calculates the threshold value th3 to be compared to the overlapping ratio.

Figure 11:
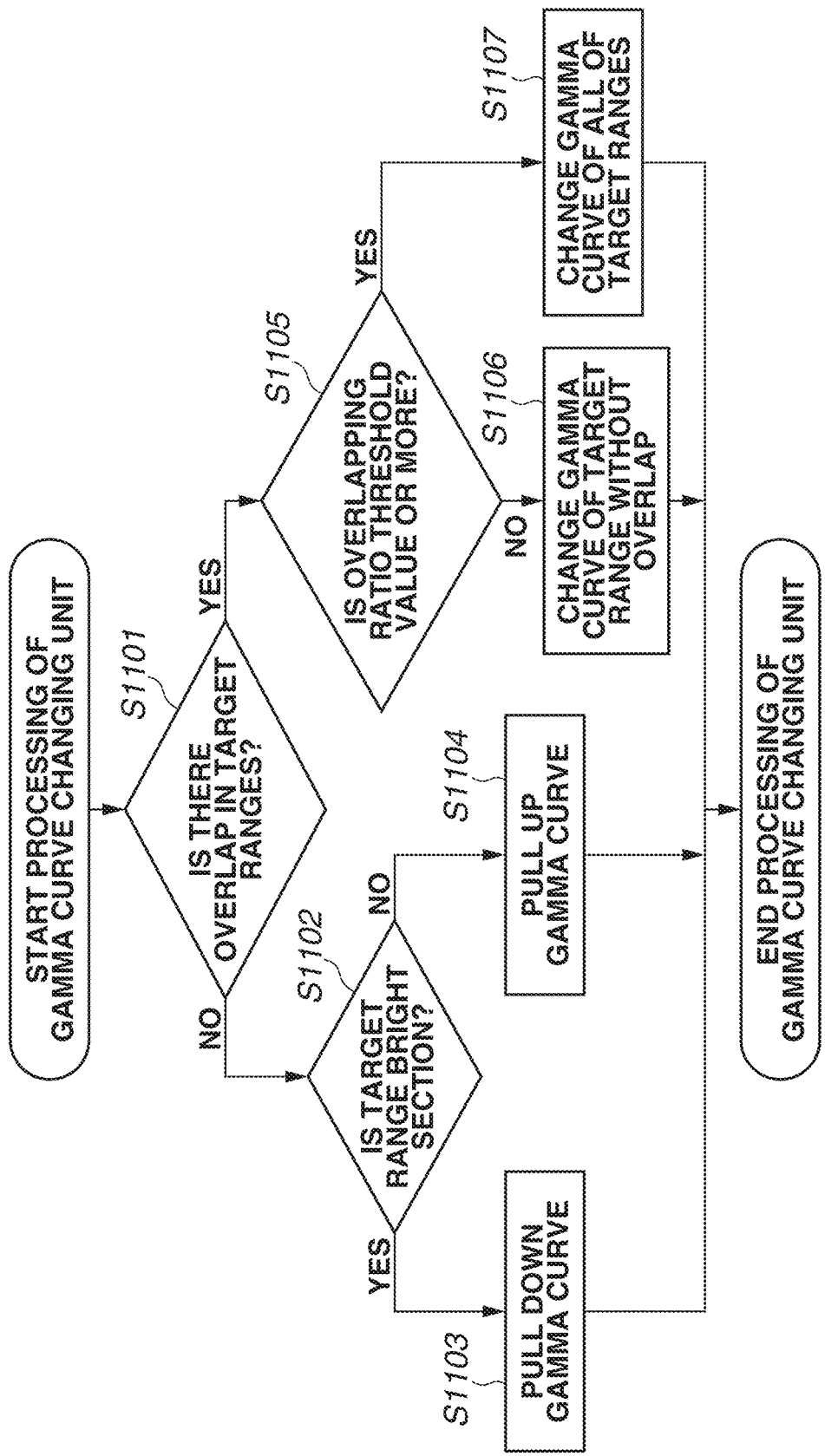
FIG. 11 is a flowchart illustrating an example of gamma curve changing processing according to the first exemplary embodiment of the disclosure.

Hereinafter, a processing flow in which the processing in step S606 is divided into steps will be described with reference to FIG. 11. FIG. 11 is a flowchart illustrating an example of gamma curve changing processing according to the present exemplary embodiment of the disclosure. The flowchart in FIG. 11 illustrates a processing procedure executed by the CPU 203 by controlling each processing block. The CPU 203 loads a program stored in the memory (the ROM 204 or the RAM 205) included in the CPU 203 and executes the loaded program to realize the above-described processing.

Figure 12:
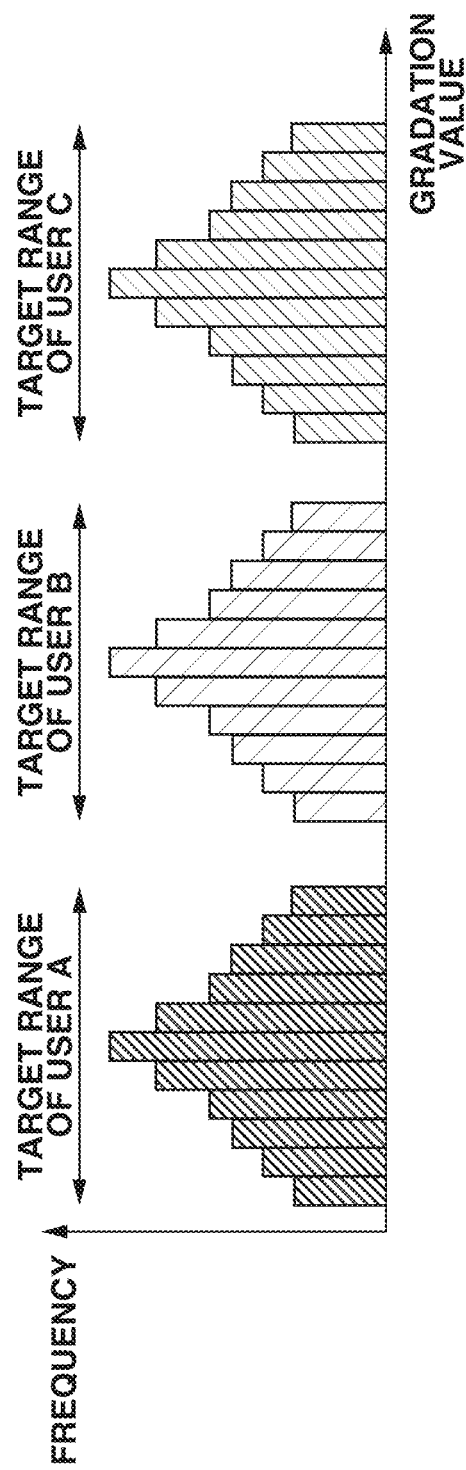
FIG. 12 is a graph illustrating a state where target gradation ranges of a plurality of users do not overlap each other according to the first exemplary embodiment of the disclosure.

First, in step S1101, the changing range calculation unit 901 determines whether there is an overlap between the target gradation ranges of a plurality of users (i.e., whether an overlapping ratio is greater than 0). FIG. 12 is a graph illustrating an example where there is no overlap between the target gradation ranges of a plurality of users according to the exemplary embodiment of the disclosure. As illustrated in FIG. 12, if the overlapping ratio is 0 (NO in step S1101), i.e., if there is no overlap between the target gradation ranges of any users, the processing proceeds to step S1102. On the other hand, as illustrated in FIG. 8, if the overlapping ratio is a value greater than 0 (YES in step S1101), the processing proceeds to step S1105.

In step S1102, the gamma curve changing unit 506 determines whether the target gradation range is a bright portion or a dark portion. For example, gradation as a target of determination on whether the target gradation range is a bright portion or a dark portion is expressed as a gradation value "o", and a minimum gradation value and a maximum gradation value of the gradation range acquired from the target range acquisition unit 504 are expressed as "p" and "q", respectively. If the following formula 6 is satisfied, the gradation value "o" is determined to be a bright portion. If the following formula 7 is satisfied, the gradation value "o" is determined to be a dark portion.

$$o \geq \frac{p+q}{2} \qquad \text{Formula 6}$$

$$o < \frac{p+q}{2} \qquad \text{Formula 7}$$

Figure 13:
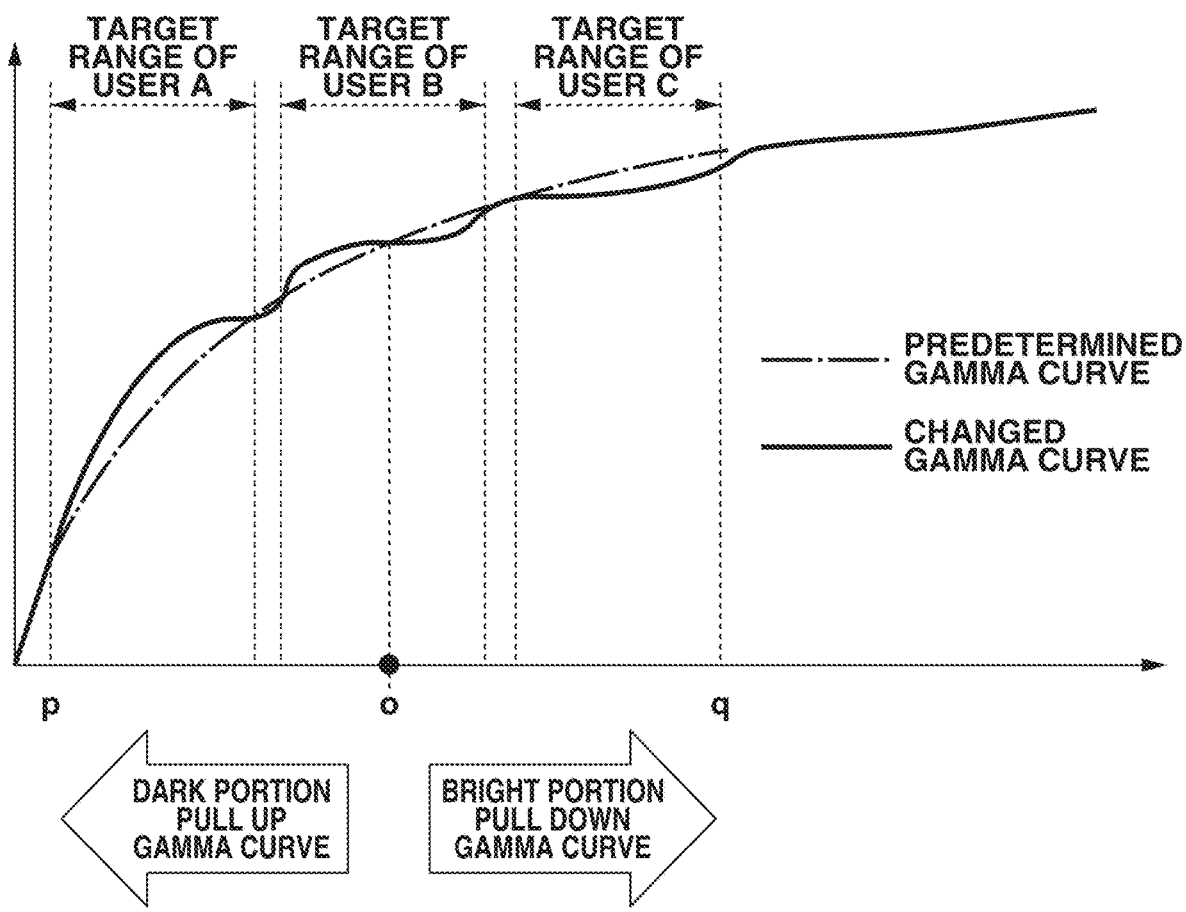
FIG. 13 is a graph illustrating an example of change of a gamma curve in a case where target gradation ranges do not overlap each other according to the first exemplary embodiment of the disclosure.

In step S1103, the range-by-range gamma curve changing unit 902 changes a gamma curve to suppress overexposure if the target gradation range is determined to be a bright portion (i.e., if the gradation value "o" satisfies the formula 6). Specifically, as illustrated in FIG. 13, a gamma curve is pulled down from a predetermined gamma curve indicated by a dashed line. FIG. 13 illustrates an example where the gamma curve is changed in a case where there is no overlap according to the first exemplary embodiment of the disclosure.

On the other hand, in step S1104, the range-by-range gamma curve changing unit 902 pulls up a gamma curve to suppress underexposure if the target gradation range is determined to be a dark portion (i.e., if the gradation value "o" satisfies the formula 7). Specifically, as illustrated in FIG. 13, a gamma curve is pulled up from the predetermined gamma curve indicated by the dashed line. At this time, the predetermined gamma curve illustrated in FIG. 13 is applied with respect to the gradation range other than the target gradation range. By changing the gamma curve as described above, the change in the entire image can minimized, and an appropriate gradation conversion can be executed with respect to the crop image selected by the user. The gamma curve changed by the range-by-range gamma curve changing unit 902 is input to the gamma processing application unit 507, and the processing executed by the gamma curve changing unit 506 is ended.

If the overlapping ratio is determined to be a value greater than 0 in step S1102, in step S1105, the gamma curve changing unit 506 determines whether the overlapping ratio is a predetermined threshold value or more. Herein, a threshold value calculated by the threshold value calculation unit 1002 is calculated according to a noise level acquired from the noise level calculation unit 1001. Specifically, the noise level calculated by the noise level calculation unit 1001 refers to dispersion of noise superimposed on the entire image. The noise dispersion is acquired by the following formulas 8 and 9.

$$\sigma^2_{Y(v,h)} = \frac{1}{(2 \times s1 + 1)(2 \times s2 + 1)} \sum_{i=-s1}^{x1} \sum_{j=-s2}^{x2} (Y(v+i, h+j) - \overline{Y}(v, h))^2 \quad \text{Formula 8}$$

$$\overline{Y}(v, h) = \frac{1}{(2 \times s1 + 1)(2 \times s2 + 1)} \sum_{i=-s1}^{s1} \sum_{j=-s2}^{s2} Y(v+i, h+j) \quad \text{Formula 9}$$

Herein, Y(v, h) represents a luminance value of the entire image in the current frame, and "v" and "h" respectively represent coordinate positions in the horizontal direction and the vertical direction in the frame. Generally, the dispersion of noise included in the signal can be calculated precisely by setting large values to "s1" and "s2". In addition, a calculation method of the noise level is not limited to the formulas 8 and 9, and various calculation methods such as a calculation method using a standard deviation of noise or a noise characteristic of a sensor can be also employed.

Figure 14:
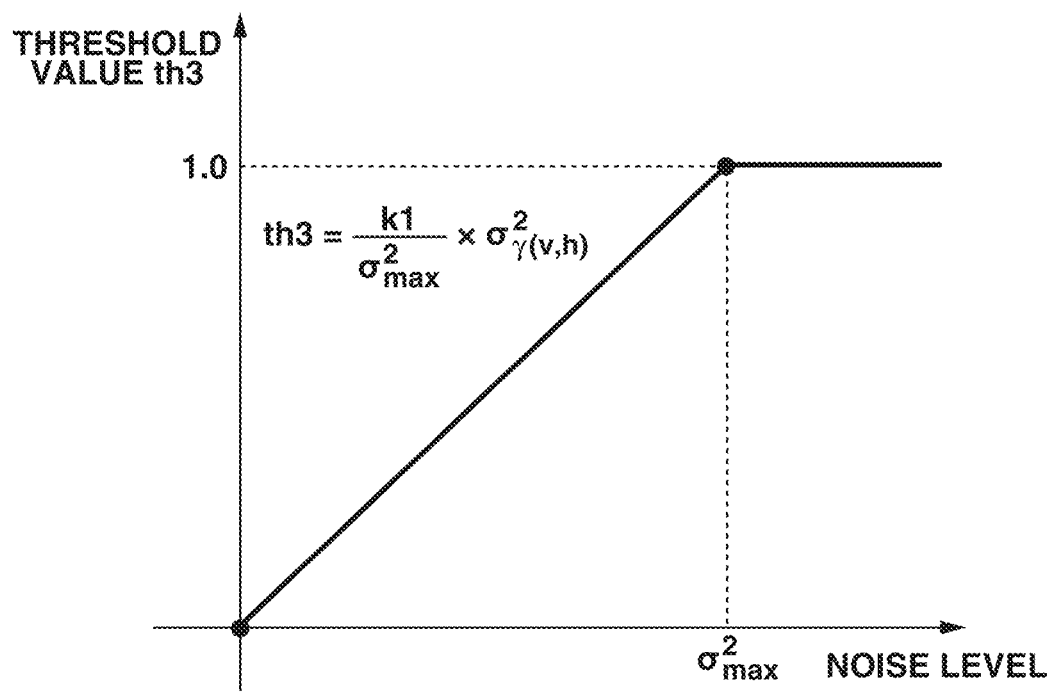
FIG. 14 is a line graph illustrating a relationship between a noise level and a threshold value according to the first exemplary embodiment of the disclosure.

FIG. 14 is a line graph illustrating a relationship between a noise level and a threshold value according to the exemplary embodiment of the disclosure. An example of a relationship between a noise level σ2Y(v, h) calculated by the noise level calculation unit 1001 based on the formula 10 and the threshold value th3 calculated by the threshold value calculation unit 1002 is illustrated in FIG. 14.

$$th3 = \begin{cases} \frac{k1}{\sigma^2_{max}} \times \sigma^2_{Y(v,h)} & \left(\text{if } \sigma^2_{Y(v,h)} < \frac{\sigma^2_{max}}{k1}\right) \\ 1.0 & \left(\text{if } \sigma^2_{Y(v,h)} \geq \frac{\sigma^2_{max}}{k1}\right) \end{cases} \quad \text{Formula 10}$$

In the formula 10, "σ2max" represents a constant number which determines an upper limit of the standard deviation of noise, "k1" represents an inclination for correlating the standard deviation of noise and the threshold value th3 in a proportional relationship in that the threshold value th3 becomes greater as the noise level is higher. In addition, the relationship between the noise level and the threshold value th3 is not limited to such a proportional relationship as illustrated in FIG. 14 and the formula 10, and can be expressed by a non-linear function such as a quadratic function or a cubic function.

The gamma curve changing unit 506 uses the acquired threshold value th3 to compare the overlapping ratio with the threshold value th3. If the overlapping ratio is less than the threshold value th3 (NO in step S1105), the processing proceeds to step S1106. If the overlapping ratio is the threshold value th3 or more (YES in step S1105), the processing proceeds to step S1107.

Figure 15:
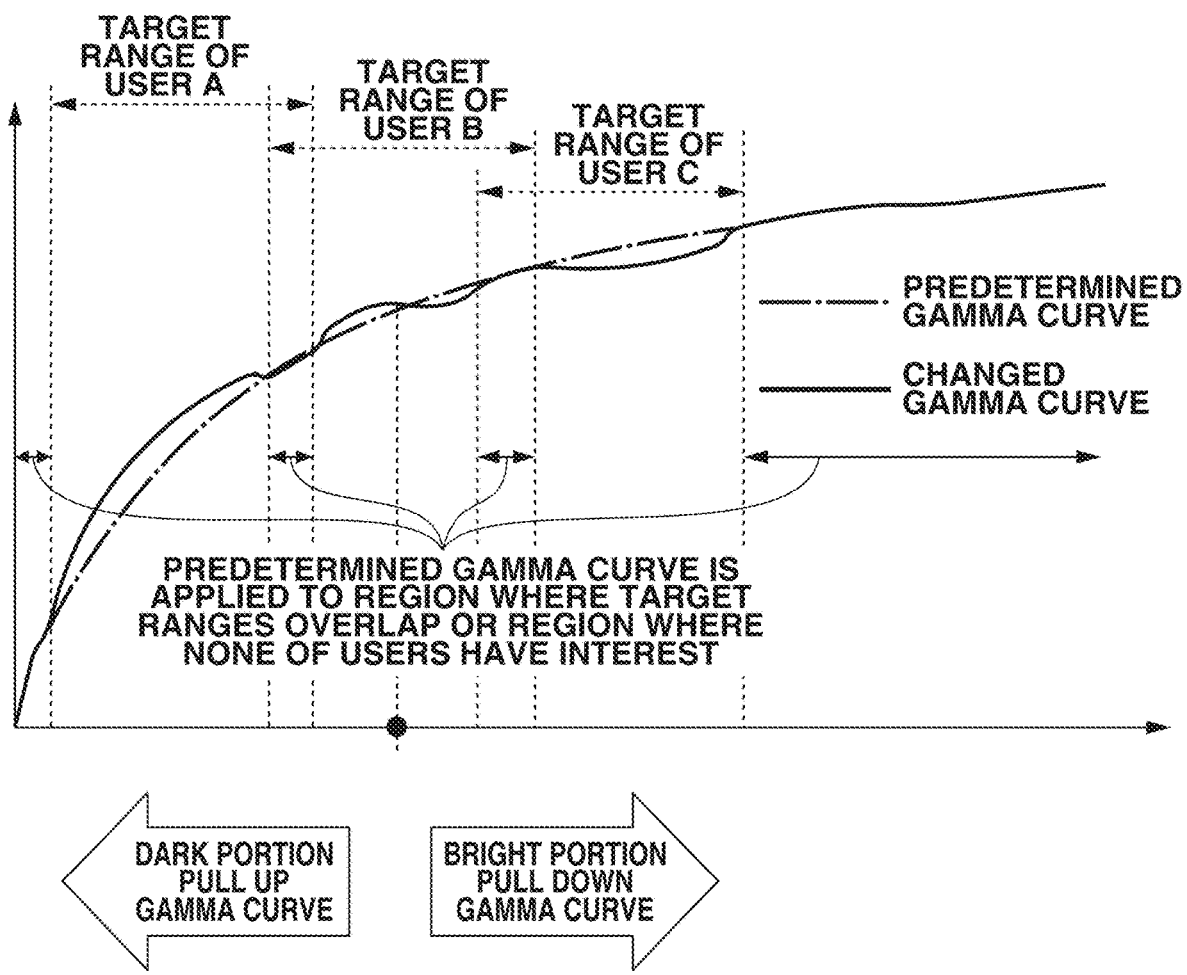
FIG. 15 a graph illustrating an example of change of a gamma curve in a case where target gradation ranges overlap each other according to the first exemplary embodiment of the disclosure.

If the gamma curve changing unit 506 determines that the overlapping ratio is less than the predetermined threshold value th3 in step S1105, in step S1106, similar to the processing in step S1102, the gamma curve changing unit 506 determines whether the target gradation range is a bright portion or a dark portion. Thereafter, as illustrated in FIG. 15, the gamma curve is changed with respect to the gradation range where there is no overlap between any target gradation ranges. FIG. 15 is a diagram illustrating an example where the gamma curve is changed in a case where there is no overlap according to the exemplary embodiment of the disclosure. In order to suppress the overexposure, the gamma curve of an area determined to be a bright portion is changed and pulled down from the predetermined gamma curve. On the other hand, if the target gradation range is determined to be a dark portion, the gamma curve is pulled up from the predetermined gamma curve in order to suppress the underexposure. At this time, the predetermined gamma curve is applied with respect to a gradation range where there is an overlap between the target ranges and a gradation range other than the target gradation range. As described above, by changing the gamma curve, a change in the entire image and an interference between crop images of users can be suppressed to minimum, and an appropriate gradation conversion can be executed with respect to the crop images selected by the users. The changed gamma curve is input to the gamma processing application unit 507, and the processing executed by the gamma curve changing unit 506 is ended.

Figure 16:
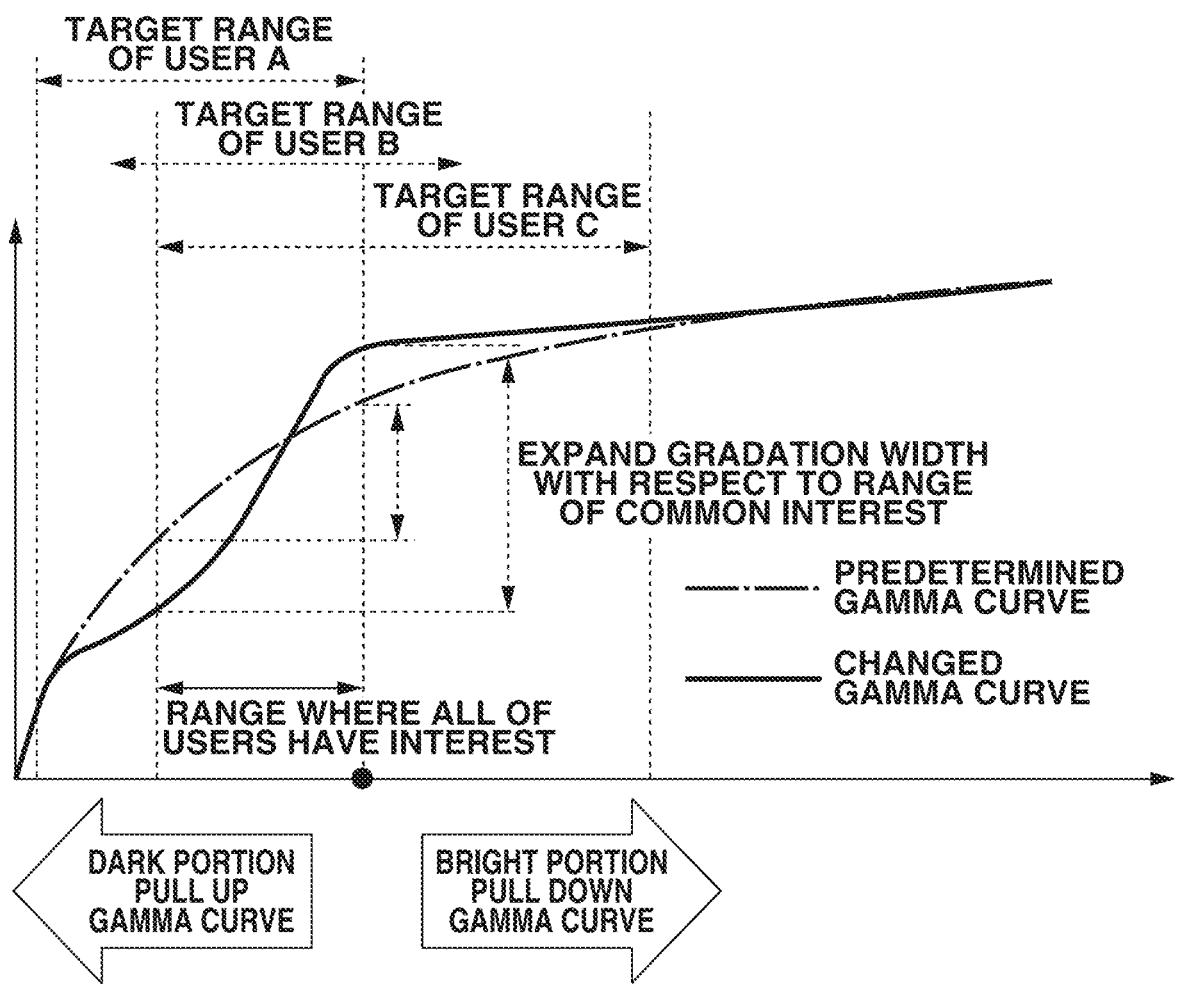
FIG. 16 is a graph illustrating an example of change of a gamma curve in a case where target gradation ranges overlap each other over a wide area according to the first exemplary embodiment of the disclosure.

If the gamma curve changing unit 506 determines that the overlapping ratio is the predetermined threshold value th3 or more in step S1105, in step S1107, similar to the processing in step S1102, the gamma curve changing unit 506 determines whether the target gradation range is a bright portion or a dark portion. Thereafter, as illustrated in FIG. 16, the gamma curve is changed with respect to all of the target gradation ranges regardless of presence or absence of an overlap. FIG. 16 is a graph illustrating an example where the gamma curve is changed when there is an overlap over a wide range according to the exemplary embodiment of the disclosure. As described above, the change of the gamma curve is executed by the range-by-range gamma curve changing unit 902. At this time, a predetermined gamma curve is applied with respect to the gradation range other than the target gradation range. As described above, although changing the gamma curve with respect to a wide gradation range causes a substantial change in the entire image, it is possible to improve a gradation characteristic in a target gradation range that is focused on by a plurality of users in common. The changed gamma curve is input to the gamma processing application unit 507, and the processing executed by the gamma curve changing unit 506 is ended.

When the gamma curve changing processing in step S606 described with reference to FIG. 11 is completed, in step S607, the gamma processing application unit 507 applies the gamma curve received from the gamma curve changing unit 506 to the input signal.

By executing the above-describe processing steps to the moving image signal, the gamma processing according to the aspect of the embodiments can be reflected on the entire image as well as the crop image. According to the present exemplary embodiment, an appropriate gamma curve can be determined according to the crop image selected by the user. For example, as illustrated in FIG. 11, in a case there is no overlap between the target gradation ranges of the crop images monitored by the users, the gamma curve is finely changed for the respective users, so that images processed by the appropriate graduation processing are distributed. On the other hand, as illustrated in FIG. 15, in a case where there is a certain degree of overlap between the target gradation ranges of the crop images of the users, images processed by the appropriate graduation processing are distributed while a change of the image that affects the entire image is minimized. Further, as illustrated in FIG. 16, if the target gradation ranges of the users overlap with each other considerably, the gamma curve is changed with respect to the wide gradation range. Therefore, although the impression of the entire image will be substantially different from that of the image where the predetermined gamma processing is executed thereon, a gradation characteristic can be improved with respect to the target gradation range that is focused on by the plurality of users in common.

In the present exemplary embodiment of the disclosure, although an example in which gamma processing is executed with respect to the luminance component is described above, a component on which the gamma processing is executed is not limited in particular. For example, similar processing can be executed with respect to a color component or a near-infrared or a far-infrared component.

Figure 18:
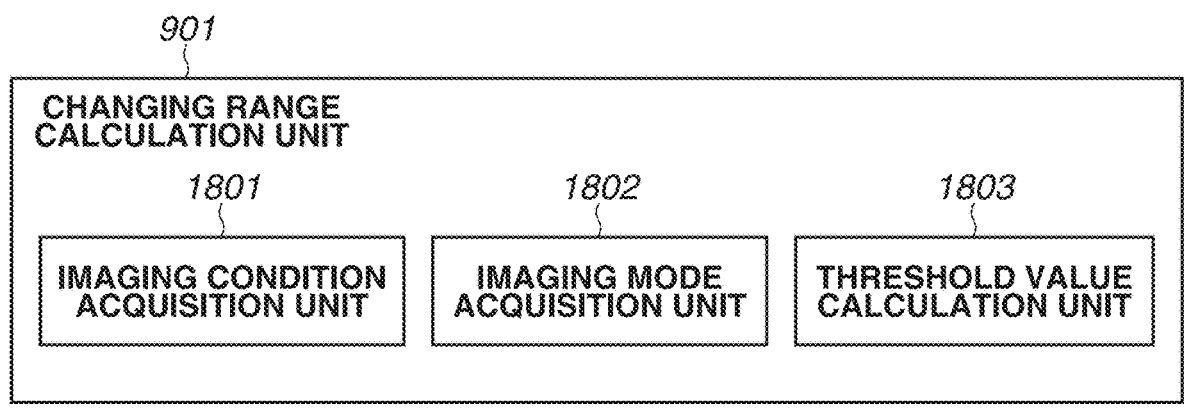
FIG. 18 is a block diagram illustrating a configuration example of a changing range calculation unit according to the second exemplary embodiment of the disclosure.

Hereinafter, a second exemplary embodiment will be described. In the first exemplary embodiment, a method of calculating a threshold value according to a noise level calculated by the noise level calculation 1001 illustrated in FIG. 10 has been described. Hereinafter, processing of the changing range calculation unit 901 according to the second exemplary embodiment will be described in detail with reference to FIG. 18. FIG. 18 is a block diagram illustrating a configuration example of the changing rage calculation unit according to the second exemplary embodiment of the disclosure. The changing range calculation unit 901 of the second exemplary embodiment includes an imaging condition acquisition unit 1801, an imaging mode acquisition unit 1802, and a threshold value calculation unit 1803. The imaging condition acquisition unit 1801 acquires various imaging conditions including an aperture and a shutter for capturing an input image to be acquired by an input image acquisition unit. The imaging mode acquisition unit 1802 acquires an imaging mode. The threshold value calculation unit 1803 calculates a threshold value from the imaging condition acquired by the imaging condition acquisition unit 1801. In addition, the same reference numeral is applied to a configuration similar to the configuration in the first exemplary embodiment, and description thereof will be omitted.

Figure 17:
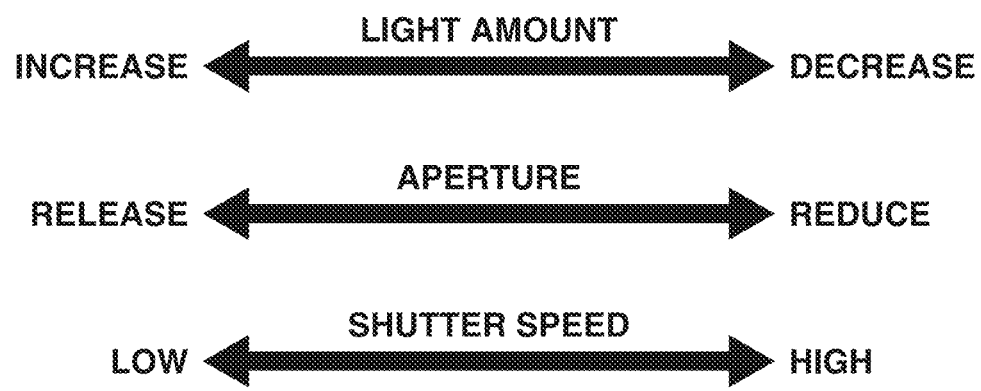
FIG. 17 is a diagram illustrating a relationship among a light amount, an aperture, and a shutter speed according to a second exemplary embodiment of the disclosure.

The noise level acquired in the first exemplary embodiment is calculated from an input image through the formulas 8 and 9. In the second exemplary embodiment, the noise level is calculated based on the imaging condition and the imaging mode. FIG. 17 is a diagram illustrating a relationship between a light amount, an aperture, and a shutter speed according to the second exemplary embodiment of the disclosure. As illustrated in FIG. 17, an amount of light received by the sensor is smaller as an aperture of the lens is reduced, and an image with more noise is acquired. On the other hand, an amount of light received by the sensor is greater if an aperture is released closer to the open end, and an image with less noise is acquired. Similarly, an image with more noise is acquired if a shutter speed is higher, and an image with less noise is acquired if a shutter speed is lower.

As described above, in the present exemplary embodiment, a noise level σ2Y(v, h) is calculated by using a relationship between the aperture and the shutter speed. In addition, the imaging condition to be used is not limited to the aperture and the shutter, and a condition such as a gain or a sensor temperature may be also used.

Further, in the monitoring camera, various modes can be selected according to scenes. For example, a motion priority mode is intended to be used for a scene including a large number of moving objects. Therefore, when the motion priority mode is being executed, the target gradation range detected from the histogram may significantly change from time to time because various objects are assumed to move in and out of the screen. Therefore, when the motion priority mode is selected, the inclination "k1" in the formula 10 is set to be smaller. Through the above setting, an amount of change of the threshold value th3 caused by fluctuation of the noise level is reduced, so that the gamma curve can be changed appropriately without making an unnecessary change. In addition, the imaging mode to be used is not limited to the motion priority mode, but an imaging mode other than the motion priority mode may be also used. The processing to be executed after acquiring the threshold value th3 is similar to that of the first exemplary embodiment, and thus description thereof will be omitted.

As described above, according to the second exemplary embodiment, it is possible to execute gamma processing in which the crop image, the imaging condition, and the imaging mode selected by the user are taken into consideration.

Figure 19:
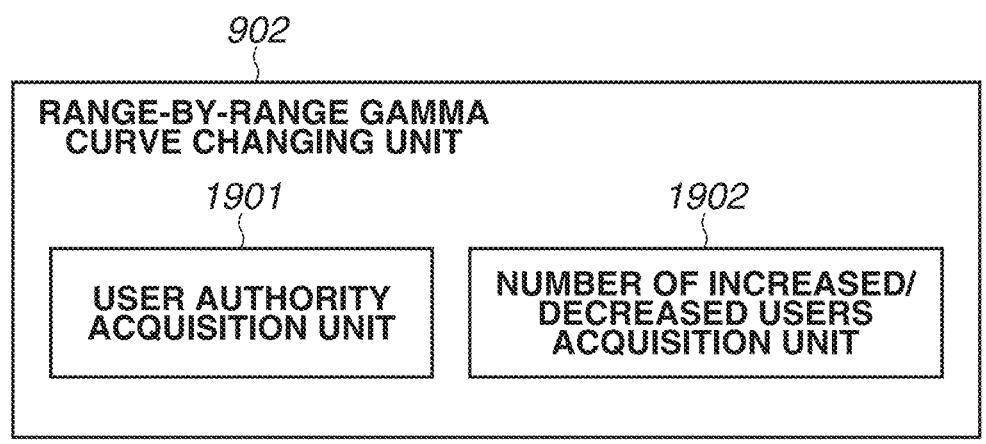
FIG. 19 is a block diagram illustrating a configuration example of a range-by-range gamma curve changing unit according to a third exemplary embodiment of the disclosure.

Hereinafter, a third exemplary embodiment will be described. In the first exemplary embodiment, a method of changing a gamma curve based on the changing range calculated by the changing range calculation unit 901 illustrated in FIG. 9 has been described. Hereinafter, the range-by-range gamma curve changing unit 902 according to the third exemplary embodiment will be described with reference to FIG. 19. FIG. 19 is a block diagram illustrating a configuration example of the range-by-range gamma curve changing unit 902 according to the third exemplary embodiment of the disclosure. As illustrated in FIG. 19, the range-by-range gamma curve changing unit 902 includes a user authority acquisition unit 1901 for acquiring user authorities granted to a plurality of users and a number of increased/decreased users acquisition unit 1902 for acquiring the number of increased/decreased users which is changed at a certain time period. In addition, the same reference numeral is applied to a configuration similar to the configuration in the first exemplary embodiment, and description thereof will be omitted.

The range-by-range gamma curve changing unit 902 of the first exemplary embodiment changes the gamma curve with respect to the gradation range acquired from the changing range calculation unit 901. In the third exemplary embodiment, a gamma curve is changed while information about a user authority and the number of increased/decreased users is taken into consideration in addition to information about a gradation range described in the first exemplary embodiment. Hereinafter, a specific flow of processing will be described.

In a case where the number of users who crop out regions that do not overlap with other regions is increased, the gamma curve is appropriately with respect to the target range of each user like the a first exemplary embodiment without other particular processing (Cf. FIG. 13).

In a case where the number of users who crop out regions that overlap with other regions is increased, whether to change the gamma curve is determined by an authority of a corresponding user. If the additional user is given an administrator authority, a change of the gamma curve is immediately executed. If the additional user is given only a general authority, the gamma curve is changed at a timing at which substantial change has occurred in the luminance of the entire image or the object, i.e., a timing at which the luminance of the imaging environment is changed or a pan/tilt operation is executed.

As described above, by changing the gamma curve while considering increase or decrease in the number of users and user authorities, unnecessary change of the gamma curve caused by increase or decrease in the number of users can be suppressed, and appropriate gamma processing is executed with respect to a user who holds an administrator authority.

As described above, according to the third exemplary embodiment, it is possible to execute gamma processing in which increase or decrease in the number of users and user authorities are taken into consideration in addition to the crop images selected by the users.

Although exemplary embodiments of the disclosure have been described above, the disclosure is not limited to the above-described exemplary embodiments, and may be changed and applied as appropriate according to a target circuit configuration within a technical spirit of the aspect of the embodiments. For example, an imaging apparatus described as a camera in the above-described exemplary embodiment may be applied to a digital still camera or a digital video camera.

Further, the aspect of the embodiments can be embodied as, for example, a system, an apparatus, a method, a computer program, or a storage medium. Specifically, the aspect of the embodiments may be applied to a single apparatus or a system that includes a plurality of apparatuses. The respective units constituting the imaging apparatus and the steps of the control method of the imaging apparatus according to the present exemplary embodiment can be realized through an operation of a program stored in a memory of a computer. The computer program and a computer readable storage medium storing that program are also included within the scope of the aspect of the embodiments.

The disclosure can be realized in such a manner that a program for realizing one or more functions according to the above-described exemplary embodiments is supplied to a system or an apparatus via a network or a storage medium, so that the one or more processors in the system or the apparatus read and execute the program. Further, the aspect of the embodiments can be also realized with a circuit (e.g., application specific integrated circuit (ASIC)) that realizes one or more functions.

According to an aspect of the embodiments, even in a case where a plurality of users performs cropping on a distributed image, a gradation characteristic can be improved with respect to each of the plurality of images (crop images).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)m), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-148613, filed Jul. 31, 2017, which is hereby incorporated by reference herein in its entirety.

What is claimed is:

1. An apparatus comprising:
   at least one processor; and
   a memory that is coupled to the at least one processor and stores one or more computer-readable instructions, wherein the computer-readable instructions cause, when executed by the at least one processor, the at least one processor to operate to:
   allow users to specify a plurality of arbitrary image regions;
   crop out and output each of the respective arbitrary image regions from an entire image acquired by imaging an object;
   acquire pieces of information indicating gradation of the respective arbitrary image regions; and change a gradation conversion characteristic of the entire image based on the acquired pieces of information, wherein the information indicating gradation is information indicating a target gradation range in which pixels of a predetermined rate or more are included, from among gradation ranges of the arbitrary image regions.

2. The apparatus according to claim 1, wherein the at least one processor further operates to:
calculate an overlapping ratio of information indicating gradation of an arbitrary image region to information indicating gradation of another arbitrary image region, among the pieces of information, and
change the gradation conversion characteristic based on the pieces of information indicating gradation of the respective arbitrary image regions and the overlapping ratio.

3. The apparatus according to claim 1, wherein the at least one processor further operates to:
calculate an overlapping ratio of information indicating gradation of an arbitrary image region to information indicating gradation of another arbitrary image region, among the pieces of information, and
change the gradation conversion characteristic based on the gradation ranges of the respective image regions and the overlapping ratio.

4. The apparatus according to claim 1, wherein, with respect to gradation that is not included in any of the target gradation ranges of the plurality of arbitrary image regions from among information indicating gradation of the entire image, the at least one processor operates to determine the gradation conversion characteristic not to be changed from a predetermined gradation conversion characteristic.

5. The apparatus according to claim 2, wherein the at least one processor further operates to:
calculate a gradation range to be corrected based on the pieces of information indicating gradation of the respective optional image regions and comparison between the overlapping ratio and a predetermined threshold value, and
change a gradation conversion characteristic of the gradation range calculated by the changing range calculation unit.

6. The apparatus according to claim 5, wherein the at least one processor further operates to make the predetermined threshold value be greater when a noise level of the entire image is higher.

7. The apparatus according to claim 6, wherein the noise level is calculated based on an imaging condition including an aperture and a shutter for imaging the entire image.

8. The apparatus according to claim 6, wherein the at least one processor operates to change a change amount of the predetermined threshold value according to the noise level based on an imaging mode for imaging the entire image.

9. The apparatus according to claim 1, wherein the at least one processor operates to change the gradation conversion characteristic by correcting a predetermined gamma curve.

10. The apparatus according to claim 1, wherein the at least one processor operates to allow a plurality of users to specify the plurality of arbitrary image regions via a network.

11. The apparatus according to claim 1, wherein, in a case where an arbitrary image region is newly specified by the at least one processor, the at least one processor operates to change a timing of reflecting information indicating gradation of the newly specified image region on a change of the gradation conversion characteristic according to an authority of a user who newly specifies the image region.

12. The apparatus according to claim 1, wherein the at least one processor further operates to distribute images of the plurality of arbitrary image regions on a real-time basis.

13. A method comprising:
allowing users to specify a plurality of arbitrary image regions;
cropping out and outputting each of the respective arbitrary image regions from an entire image acquired by imaging an object;
acquiring pieces of information indicating gradation of the respective arbitrary image regions; and
changing a gradation conversion characteristic of the entire image based on the acquired pieces of information,
wherein the information indicating gradation is information indicating a target gradation range in which pixels of a predetermined rate or more are included, from among gradation ranges of the arbitrary image regions.

14. The method according to claim 13, further comprising calculating an overlapping ratio of information indicating gradation of an arbitrary image region to information indicating gradation of another arbitrary image region, among the pieces of information,
wherein, in the changing of the gradation conversion characteristic, the gradation conversion characteristic is changed based on the pieces of information indicating gradation of the respective arbitrary image regions and the overlapping ratio.

15. A non-transitory computer-readable storage medium storing a computer program for causing a computer to execute a method comprising:
allowing users to specify a plurality of arbitrary image regions;
croppinq out and outputting each of the respective arbitrary image regions from an entire image acquired by imaging an object;
acquiring pieces of information indicating gradation of the respective arbitrary image regions; and
changing a gradation conversion characteristic of the entire image based on the acquired pieces of information,
wherein the information indicating gradation is information indicating a target gradation range in which pixels of a predetermined rate or more are included, from among gradation ranges of the arbitrary image regions.

* * * * *